Feb. 19, 1963
A. S. ANDERSON
3,077,985
APPARATUS FOR STRIPPING TOBACCO
Filed Dec. 12, 1961
2 Sheets-Sheet 1
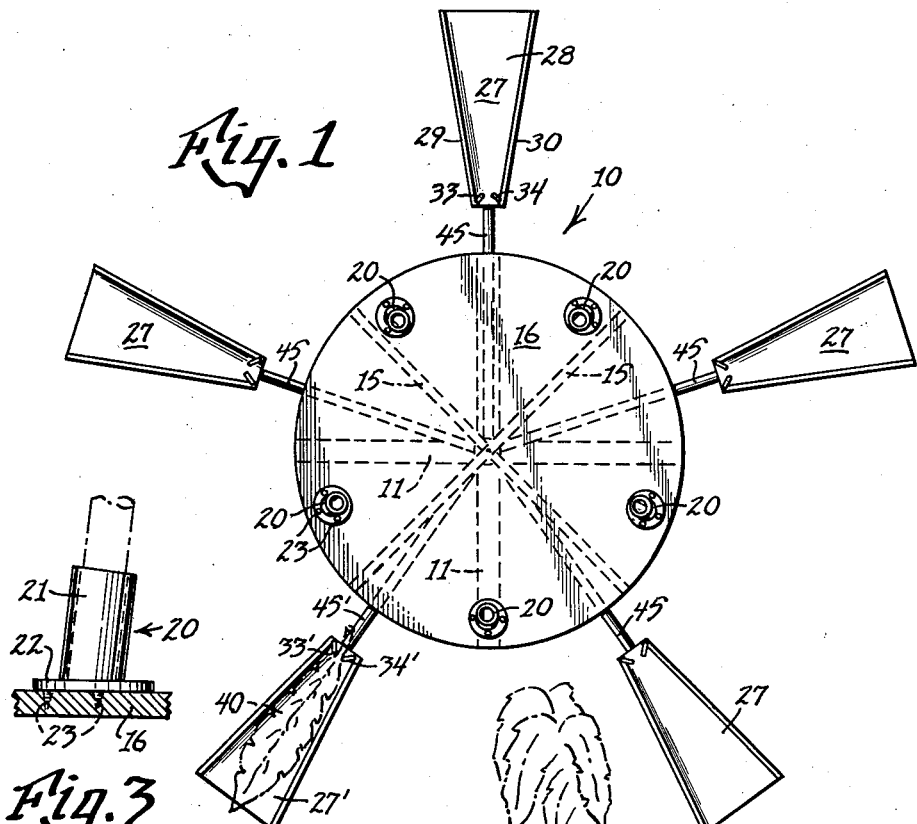
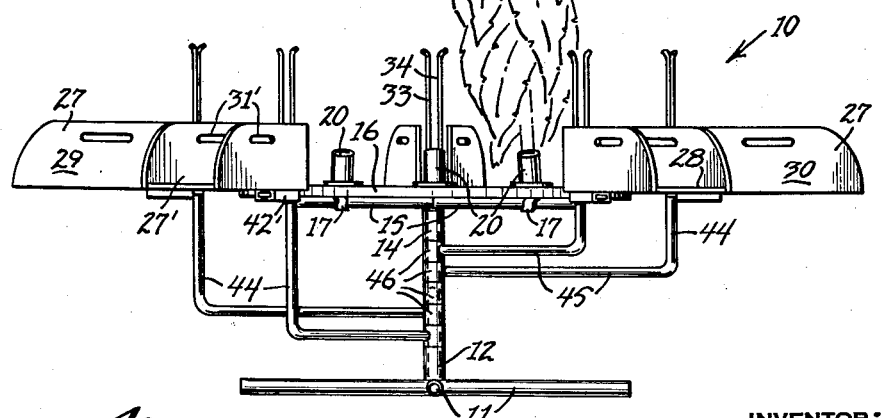
INVENTOR:
ALEXANDER S. ANDERSON
BY
Harrington A. Lackey
ATTORNEY Feb. 19, 1963  A. S. ANDERSON  3,077,985
APPARATUS FOR STRIPPING TOBACCO
Filed Dec. 12, 1961  2 Sheets-Sheet 2
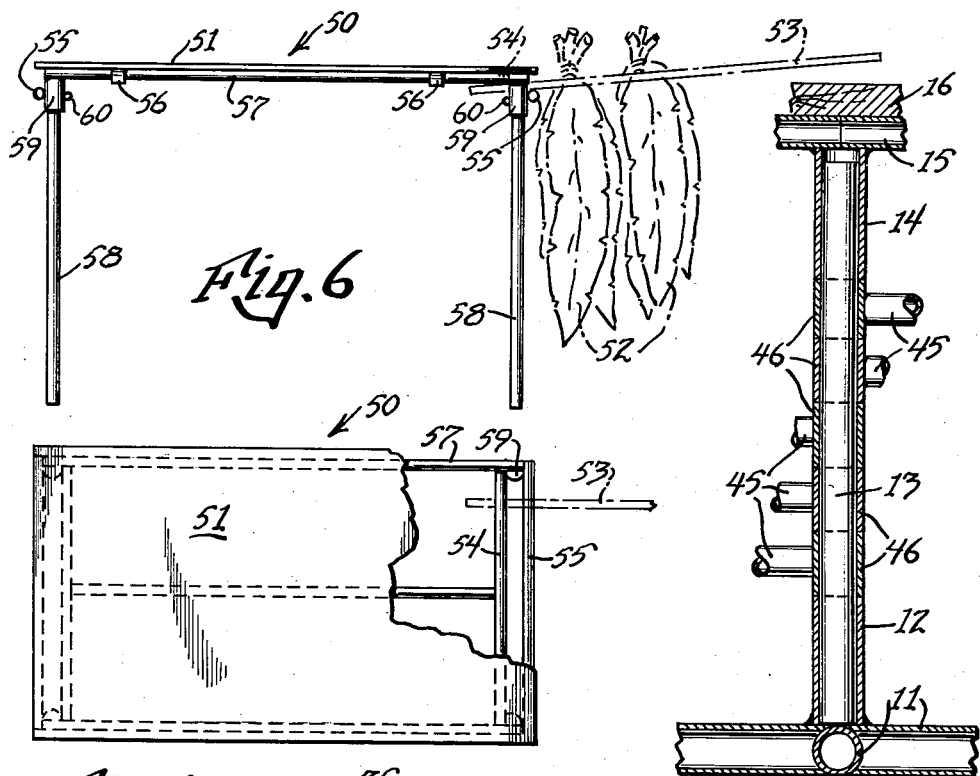
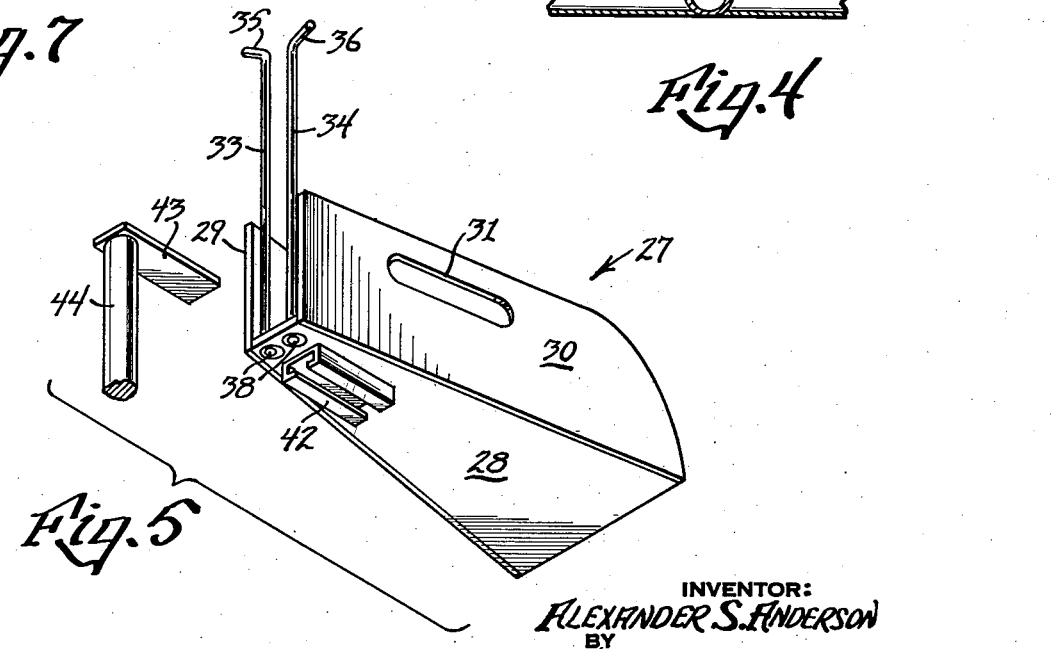
INVENTOR:
ALEXANDER S. ANDERSON
BY
Harrington A. Lackey
ATTORNEY

United States Patent Office 3,077,985
Patented Feb. 19, 1963

3,077,985
APPARATUS FOR STRIPPING TOBACCO
Alexander S. Anderson, Hendersonville, Tenn.
Filed Dec. 12, 1961, Ser. No. 158,747
11 Claims. (Cl. 209—124)

This invention relates to an apparatus for processing tobacco, and more particularly to an apparatus for simplifying and making more efficient the stripping, classifying and tying of tobacco leaves.

Heretofore, the accepted way of stripping and classifying tobacco leaves has been a manual process which has been slow and inefficient. Since a tobacco stalk usually has leaves of five different classes graded from the base to the tip of the stalk, namely: "trash," "lugs," "bright leaf," "long red," and "tips," five workers are employed to strip the leaves from the stalks, one worker for each class of leaves. Generally, the five workers will stand along a long table, upon one end of which the tobacco stalks are piled. The first worker picks up a stalk in one hand, pulls the "trash" from the stalk with his other hand and throws or drops the stalk in front of the second worker. The second worker then picks up the stalk with one hand, pulls the "lugs" from the stalk with his other hand, and drops or throws the stalk in front of the third worker. The third, fourth and fifth workers, in turn, repeat the actions of the first and second workers to strip the respective classes of leaves for which they are responsible, namely the "bright leaf," "long red," and "tips," respectively. When the fifth worker has finished stripping the "tips," he throws the stripped stalk away.

As the leaves are picked or stripped from the stalk, the leaves are held in the picking hand until it can hold no more. The worker then stops stripping until he can tie the picked leaves in a "hand" of tobacco, a term applied to a handful of tobacco leaves.

Such a manual process of stripping and tying leaves as described above has many disadvantages which make the process inefficient, wasteful and time consuming. In the first place, only the worker's stripping hand is productive, since the other hand must be employed in picking up the stalk, holding the stalk while it is being stripped, and placing the stalk in front of the next worker. As the one productive hand continues to accumulate picked leaves, the efficiency of the productive hand is reduced. Also, when a "hand" of tobacco has to be tied by the worker, both of his hands must be diverted from the stripping operation to the tying operation. Since adjacent workers will probably not tie their "hands" at the same time, one worker may be idle until the adjacent worker finishes tying his leaves and resumes stripping the stalks. Moreover, when a worker finishes tying his "hands," he may find in front of him an accumulation of stalks, some of which may have to be untangled before stripping can resume.

It is therefore an object of this invention to overcome the above disadvantages by providing an apparatus which will assist the tobacco worker in stripping and tying the leaves in a more efficient manner.

Another object of this invention is to provide an apparatus for holding the tobacco stalks and conveying them to each successive worker, in order to permit both the worker's hands to be more productive.

Another object of this invention is to provide a means for conveniently holding the stripped leaves in graded stacks.

Another object of this invention is to provide a knockdown, inexpensive, portable apparatus for holding and conveying tobacco stalks and stripped leaves, which may be readily assembled and disassembled for ready transportation to different locations and for storage in a minimum of space.

Further objects and advantages of the invention will be apparent from the following description taken in conjunction with the drawings, wherein:

FIG. 1 is a top plan view of the apparatus;

FIG. 2 is a side elevation of the apparatus of FIG. 1, disclosing a tobacco stalk supported upright in one of the holders;

FIG. 3 is an enlarged side elevation of one of the stalk holders mounted on the rotary support table, shown fragmentarily in section;

FIG. 4 is an enlarged fragmentary sectional elevation of the support frame of the apparatus disclosed in FIGS. 1 and 2;

FIG. 5 is an exploded, perspective operational view of the leaf holding device and its detachable support;

FIG. 6 is a side elevation of the tie-table supporting a tobacco stick, shown in phantom;

FIG. 7 is a top plan view of the device disclosed in FIG. 6, with a portion of the table top broken away.

Referring now more particularly to the drawings, FIGS. 1 and 2 disclose an apparatus 10 for supporting and conveying tobacco stalks and leaves, having a base 11 of any convenient type, such as the cruciform pipes disclosed in FIGS. 2 and 4. In the center of the base 11 is an upstanding tubular socket 12, adapted to telescopingly receive the bottom end of an upright support rod or shaft 13. As best disclosed in FIG. 4, the upper end of the rod 13 is adapted to be telescopingly received in an inverted or tubular socket 14 fixed to and depending from the center of a table support frame 15. The table frame 15 may also comprise cruciform pipes, as disclosed in FIGS. 1, 2 and 4. A circular table 16 of any convenient material, such as plywood, may be supported in substantially horizontal position and secured to the frame 15 by means, such as spring clips 17.

A plurality of stalk holders 20 are preferably uniformly spaced around the periphery of the top of the table 16. Although five of the holders 20 are disclosed in FIG. 1 to support in upright position tobacco stalks, such as 25, in front of each of the five workers, where five grades of tobacco leaves are being stripped, any desired number of holders 20 may be mounted on the table top 16. In fact, it has been found advantageous to use six stalk holders 20 when five workers are employed, in order to have an extra stalk holder available for loading and unloading.

A preferred embodiment of the stalk holder 20 is disclosed in FIG. 3, and includes an upright tubular socket 21 having an open top and a bottom closed by the solid disc or base 22. The base 22 may be securely fastened to the top of the table 16 by any convenient means, such as the wood screws 23. Each socket 21 is supported on its base 22 in such a manner that it will form an acute angle with the base 22 of approximately 83 degrees, so that the socket 21 will incline toward the center of the table 16 at an angle of substantially 7 degrees to the vertical. Thus, each of the stalk holders 20 will lean slightly toward the center of the apparatus 10 so that the tobacco leaves will hang over the middle of the table and will not clutter the working space around the periphery of the table 16.

Also adapted to be mounted around the periphery of the table 16 are a plurality of leaf containers 27. Again, FIG. 1 discloses five of these containers 27, to provide a place for each of the five workers to deposit the stripped leaves of his particular grade. Each of the containers 27, as best disclosed in FIG. 5, comprises a bottom wall 28 having an inner edge and an outer edge, and a pair of side edges which diverge from the outer edge inwardly toward the inner edge and the center of the apparatus 10. A pair of side walls 29 and 30 are fixed to extend upwardly from each of the side edges and normal to the bottom wall 28. Each of the side walls 29 and 30 are of substantially uniform shape and include elongated openings 31 to provide hand holds.

A pair of guide rods 33 and 34 are supported in the front portion of the bottom wall 28 to extend upwardly parallel to each other and spaced apart sufficiently to slidably receive the stems of the stripped tobacco leaves. The upper end portions 35 and 36 of each of the rods 33 and 34, respectively, diverge outwardly to assist in guiding the stems downwardly between the rods 33 and 34. The bottom ends of the rods 33 and 34 may be secured in the bottom wall 28 in any convenient manner, such as having threaded ends to engage the internally threaded ferrules 38, press-fitted into mating openings in the bottom wall 28. FIG. 1 illustrates the proper position of a stripped leaf 40 in the container 27', with its stem received between the guide rods 33' and 34'.

Each leaf container 27 is adapted to be detachably supported to the main support shaft 13. A bracket 42 comprising a slotted channel provides a slide or guide way to receive a substantially rectangular tongue or bar 43 fixed to the top of the vertical portion 44 of an angular support arm, which is bent to form a horizontal or laterally extending portion 45. The inner end of the lateral arm portion 45 terminates in a tubular collar 46 which is adapted to telescope over the main support shaft 13. Although all of the tubular collars 46 are telescoped or stacked in vertical relationship over the shaft 13, the containers 27 are maintained in substantially the same level or horizontal position about the table 16 by virtue of the vertical arm portions 44 having progressively different lengths to correspond with the differences in elevation between their corresponding tubular collars 46.

Although the tubular collars 46 permit each container 27 to be independently rotated about the shaft 13 to any desired rotary position about the table 16, the friction between the vertically stacked collars 46 and the weight of the table 16 and the table frame 15 upon the collars 46 will normally maintain the leaf containers 27 in any desired stationary position, particularly while the worker is stripping the leaves. Moreover, it is possible for the worker to rotate the table 16 without rotating the leaf container 27.

In a preferred arrangement of the apparatus 10, FIG. 1 discloses five stalk holders 20 and five leaf containers 27 for each of the usual five grades of tobacco leaves on a stalk. Moreover, FIG. 1 discloses the stalk holders 20 spaced at substantially equal intervals around the periphery of the table 16, and also a uniform interval of leaf containers 27, each leaf container being located substantially midway between each adjacent pair of holders 20. In this manner, each of the five workers may stand between a pair of leaf containers 27, with a stalk holder 20 directly in front of him for the most efficient operation.

Since the first and second workers will be picking, respectively, the "trash" adjacent the bottom of the stalk, and the "lugs," which are the next higher leaves on the stalk 25, then the first and second workers may be seated at their respective positions around the table 16, while the third, fourth and fifth workers will have to stand in order to pick the higher leaves on the stalk 25. With a new stalk 25 inserted into the stalk holder 20 in front of the first worker, he may strip the "trash" with both hands and push the stems of the picked leaves down between the rods 33 and 34 so that the leaves will be stacked within the container 27. After the first worker has stripped the "trash," he will rotate the table 16 until the stalk 25 is in front of the second worker, who will duplicate the operation of the first worker, except that he will be picking the next higher "lugs" and depositing them in his leaf container 27. As this process continues, each worker will strip his grade of leaves and deposit them in his respective leaf container 27. When a leaf container 27 is full, another worker will detach the full container 27 by sliding the bracket 42 off of the tongue 43, and substitute an empty container 27 upon the same support arm 44. The full container 27 is then carried to a tying station, such as the tie-table 50 disclosed in FIGS. 6 and 7. The full containers 27 are placed upon the table top 51, the leaves are removed and the stems tied to form "hands" 52, which are then secured to tobacco sticks 53 in a well-known manner, and supported in a cantilever position between the transverse rods 54 and 55. The table top 51 is also detachably secured by spring clips 56 to a light table frame 57 having detachable legs 58. The legs 58 are disclosed telescopingly received in sockets 59 depending from the frame 57 and held therein by means of cotter keys 60.

It will be understood that other types of means may be provided for supporting and rotating or otherwise progressively conveying the stalk holders 20 from one stripping station to another, and therefore the invention is not limited to the circular table 16 and its accompanying supporting structure.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An apparatus for stripping tobacco comprising:
   (a) a base,
   (b) a rotary support member,
   (c) means for supporting said member on said base for substantially horizontal rotary movement,
   (d) a plurality of tobacco stalk holders mounted at spaced intervals around the periphery of said support member for rotation therewith,
   (e) each holder being adapted to loosely receive a tobacco stalk in upright position,
   (f) a plurality of tobacco leaf containers fixed to said base and spaced at predetermined stations around said support member.

2. The invention according to claim 1 in which there is a tobacco leaf container for each tobacco stalk holder.

3. The invention according to claim 1 in which each container has a bottom wall, two side walls and an open top for receiving tobacco leaves stripped from said stalks.

4. The invention according to claim 1 in which each container comprises a bottom wall and a pair of upstanding members spaced apart sufficiently to snugly receive the stems of stacked tobacco leaves.

5. The invention according to claim 1 in which said containers are detachably secured to said base.

6. The invention according to claim 1 in which each stalk holder comprises a tubular socket adapted to telescopingly receive the end of said tobacco stalk.

7. The invention according to claim 6 in which said sockets are adapted to rotate in a substantially horizontal plane, and the axis of each socket is slightly inclined to the vertical toward the center of said support member.

8. The invention according to claim 7 in which the inclination of said sockets is approximately 7 degrees from the vertical.

9. The invention according to claim 1 in which said means for supporting said rotary support member comprises an upright standard and said support member is provided with rotary bearing means for receiving said standard.

10. The invention according to claim 1 in which said means for supporting said rotary support member comprises an upright standard, an arm for each leaf container having first and second ends, means for detachably securing said leaf container to said first end, a tubular collar on said second end for slidably receiving said upright standard.

11. The invention according to claim 10 in which said collars are stacked vertically on said upright standard, but said first ends lie in a substantially horizontal plane.

References Cited in the file of this patent

UNITED STATES PATENTS

| | | |
|---|---|---|
| 429,965 | Sayers | June 10, 1890 |
| 1,548,361 | Grennor | Aug. 4, 1925 |
| 1,877,479 | Lindley | Sept. 13, 1932 |
| 2,315,013 | Pecker et al. | Mar. 30, 1943 |
| 2,633,970 | Robinson | Apr. 7, 1953 |
| 2,839,200 | Easterwood | June 17, 1958 |
| 2,919,040 | Hopkins | Dec. 29, 1959 |
| 2,974,332 | Saunders | Mar. 14, 1961 |
| 2,989,056 | La Motte | June 20, 1961 |

FOREIGN PATENTS

| | | |
|---|---|---|
| 586,560 | Germany | Oct. 23, 1933 |